United States Patent Office 3,506,641
Patented Apr. 14, 1970

3,506,641
DIAZO DYESTUFFS
Ivan H. Skoog, St. Paul, Minn., assignor to Minnesota Mining and Manufacturing Company, St. Paul, Minn., a corporation of Delaware
No Drawing. Original application Apr. 5, 1965, Ser. No. 445,775. Divided and this application June 24, 1968, Ser. No. 751,330
Int. Cl. C09b 35/08
U.S. Cl. 260—181
3 Claims

ABSTRACT OF THE DISCLOSURE

A red dyestuff of the formula

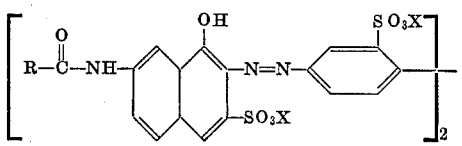

is shown wherein R is phenyl, methylphenyl or chlorophenyl and wherein X is hydrogen or an alkali metal.

---

This is a division of application Ser. No. 445,775, filed Apr. 5, 1965.

This invention relates to a new red dyestuff capable of use in the silver dye bleach process.

The silver dye bleach process and particularly its use in image reproduction is well known. Dyestuffs which can be decolorized or bleached in the presence of silver are usefully employed in such processes, as is described in U.S. Patent Nos. 2,020,775; 2,612,448; 2,644,753; 2,844,574 and Reissue Patent No. 23,357. In recent attempts to provide a system for color proofing a set of color separation positives the color proofing constructions have incorporated bleachable dyestuffs which are similar in color to the more commonly used printing inks. It has been difficult, however, to match some of the most popular red printing inks with a bleachable dyestuff which is non-diffusing in the gelatin emulsion, which produces soluble and non-staining fragments upon bleaching, which does not change in color during processing, which does not shift in hue with density change, and which does not adversely alter the desired photographic properties.

It is therefore an object of this invention to provide a novel red dyestuff which is bleachable in the silver dye bleach process.

Still another object of this invention is to provide a photosensitive silver halide emulsion containing a novel red bleachable dyestuff.

A further object of this invention is to provide a novel red bleachable dyestuff with the advantages set forth above.

The novel red bleachable dyestuff of this invention has the formula

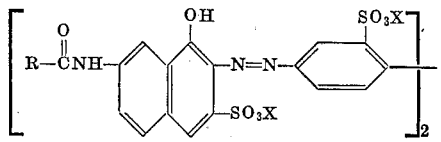

wherein R is phenyl, methylphenyl or chlorophenyl and X is H or alkali metal (e.g. sodium, potassium). The preparation of this dyestuff can be illustrated by the following procedure.

Gamma acid, i.e. 7-amino-1-naphthol-3-sulfonic acid (358.9 grams, 1.5 mole) was dissolved in 3 liters of water containing 760 grams (2.0 moles) of $Na_3PO_4 \cdot 12H_2O$. Benzoyl chloride (289 grams, 1.7 mole) was slowly added with stirring, and stirring was continued for 4 hours at a temperature of 50° C. At this point a diazotization test of the product should show no free amino groups to be present. A solution of 65 grams (1.62 mole) of sodium hydroxide in 100 milliliters of water was then added, and this mixture was stirred at 85–95° C. for one-half hour. The mixture was cooled, and 110 milliliters of concentrated hydrochloric acid was added to bring the pH to 4–4.3. After cooling to 10° C. the tan colored solid was collected on a vacuum filter. The wet filter cake was dissolved in 1 liter of boiling water. After precipitation with 1 liter of saturated sodium chloride solution, the mixture was cooled, and the solid was collected on a vacuum filter. This solid (N-benzoyl gamma acid), in a yield of about 80 percent with sodium chloride and benzoic acid as impurities, had the structure

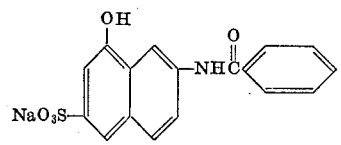

The benzoic acid can be removed by drying the solid and washing with toluene. The product can also be obtained as the calcium salt by precipitation with calcium chloride solution rather than sodium chloride solution, and the calcium salt may be purified by recrystallization from large amounts of water.

Benzidine disulfonic acid, i.e. 4,4' - diamino-2,2' - diphenyldisulfonic acid (97.8 grams, 0.24 mole) was dissolved in aqueous potassium hydroxide (40 grams KOH in 500 milliliters of water). A solution of 41 grams (0.59 mole) of sodium nitrite in 100 milliliters water was added, and the mixture was cooled to 5° C. Concentrated hydrochloric acid (115 milliliters, 1.38 mole) was added rapidly with stirring while maintaining the temperature at 15° C. or lower. This mixture gives a positive test on starch-iodide and Congo Red paper. Stirring at 15° C. or lower was continued for one-half hour, the tetraazo compound precipitating to form a slurry. The excess nitrous acid was decomposed by slowly adding sulfamic acid solution.

N-benzoyl gamma acid (205 grams, 0.5 mole) was dissolved in a solution of 312 grams (2.26 mole) of potassium carbonate and 3 liters of water, heating to the boiling point if necessary to obtain a solution. The insolubles were then removed by vacuum filtration, and the solution was cooled to about 10° C. The tetraazo compound was then added slowly to the solution with stirring. Coupling occurred immediately, and a negative diazo test was obtained after about 5 minutes. The mixture was stirred for one hour and was then allowed to stand overnight at room temperature. It was then heated to 65° C., cooled and adjusted to pH 6 with about 125 milliliters of acetic acid. A few drops of octyl alcohol may be used to control foaming. The red solid product was collected on a vacuum filter after the mixture reached 15–20° C. The filter cake was dissolved in 2 liters of hot water, and the red dyestuff was precipitated by adding a solution of 450 grams of potassium acetate in 250 milliliters of water. The dyestuff was collected, slurried with 1 liter of isopropyl alcohol, and collected once again on a vacuum filter. This slurrying and collection procedure was then repeated three times using 1 liter portions of dry methanol. After drying overnight at 110° C., 295 grams of the dark red dyestuff were obtained in the form of the potassium salt, which had a main absorption peak at 524 millimicrons.

This dyestuff can also be prepared as the sodium salt by an identical procedure using sodium carbonate and sodium acetate in place of the corresponding potassium compounds.

Those dyestuffs in which R is methylphenyl or chlorophenyl rather than phenyl can be prepared by a similar procedure, using methylbenzoyl chloride and chlorobenzoyl chloride in place of benzoyl chloride in the preparation of the N-substituted gamma acid.

I claim:
1. A red dyestuff of the formula

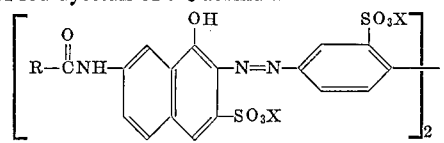

wherein R is selected from the group consisting of phenyl, methylphenyl and chlorophenyl and X is selected from the group consisting of hydrogen sodium and potassium.

2. A red dyestuff of the formula

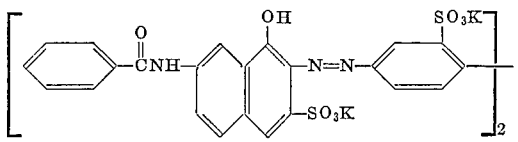

3. A red dyestuff of the formula

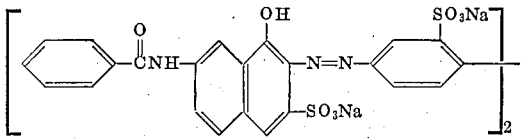

References Cited

UNITED STATES PATENTS 2,451,331  10/1948  Greig _____ 260—181 X

CHARLES B. PARKER, Primary Examiner

D. M. PAPUGA, Assistant Examiner